(12) United States Patent
Herbert et al.

(10) Patent No.: US 7,308,158 B2
(45) Date of Patent: Dec. 11, 2007

(54) IMAGING METHOD AND SYSTEM

(75) Inventors: Leslie B. Herbert, Rochester, NY (US); Karen M. Taxier, Rochester, NY (US); Howard J. Fink, Acton, MA (US); Anthony Casciano, Victor, NY (US)

(73) Assignee: Eastman Kodak Company, Rochester, NY (US)

( * ) Notice: Subject to any disclaimer, the term of this patent is extended or adjusted under 35 U.S.C. 154(b) by 872 days.

(21) Appl. No.: 10/601,233

(22) Filed: Jun. 20, 2003

(65) Prior Publication Data

US 2004/0257380 A1 Dec. 23, 2004

(51) Int. Cl.
*G06K 9/32* (2006.01)
(52) U.S. Cl. ............... 382/298; 382/235; 382/243; 382/275; 358/1.2; 358/3.26; 358/539
(58) Field of Classification Search .......... 382/274, 382/275, 298, 299, 235, 243; 358/1.2, 3.26, 358/3.27
See application file for complete search history.

(56) References Cited

U.S. PATENT DOCUMENTS

| | | | |
|---|---|---|---|
| 5,164,831 A | | 11/1992 | Kuchta et al. |
| 5,455,622 A * | | 10/1995 | Compton .................. 348/229.1 |
| 5,536,988 A * | | 7/1996 | Zhang et al. ................ 310/309 |
| 5,619,738 A | | 4/1997 | Petruchik et al. |
| 5,784,484 A * | | 7/1998 | Umezawa .................... 382/148 |
| 5,828,406 A * | | 10/1998 | Parulski et al. ........... 348/220.1 |
| 5,926,568 A * | | 7/1999 | Chaney et al. .............. 382/217 |
| 6,018,397 A * | | 1/2000 | Cloutier et al. .............. 358/1.1 |
| 6,058,248 A | | 5/2000 | Atkins et al. |
| 6,072,603 A * | | 6/2000 | Parks ......................... 358/504 |
| 6,243,131 B1 * | | 6/2001 | Martin ......................... 348/36 |
| 6,366,340 B1 * | | 4/2002 | Ishibashi et al. .............. 355/69 |
| 6,628,829 B1 * | | 9/2003 | Chasen ....................... 382/167 |
| 6,643,416 B1 | | 11/2003 | Daniels et al. |
| 6,884,999 B1 * | | 4/2005 | Yedur et al. ................ 250/306 |

FOREIGN PATENT DOCUMENTS

| | | |
|---|---|---|
| EP | 0 903 930 | 3/1999 |
| EP | 1 215 626 | 6/2002 |

OTHER PUBLICATIONS www.ofoto.com/HelpAboutPrints.
www.ofoto.com/HelpAnswerPopup.

* cited by examiner

*Primary Examiner*—Yosef Kassa

(57) ABSTRACT

Imaging methods and systems are provided for indicating at least one preferred output form for an area within a digital image. In accordance with the method, a selection area is determined within the digital image and a preferred output image form is determined for rendering an image comprising the selected area of the digital image, with the determination being based upon an image resolution of the digital image, the determined selection area and an output resolution associated with each output form. The preferred output image form is indicated.

29 Claims, 7 Drawing Sheets

IMAGING METHOD AND SYSTEM

CROSS REFERENCE TO RELATED APPLICATIONS

Cross Reference is made to Commonly Assigned U.S. patent application Ser. No. 10/028,644 filed Dec. 21, 2001, in the name of Belz, et al.

FIELD OF THE INVENTION

The present invention relates to imaging methods and systems.

BACKGROUND OF THE INVENTION

Digital images are becoming an increasingly popular form of infoimaging. One reason for this popularity is the ease with which users can manipulate, edit, alter and enhance such digital images. For example, users often use manual digital imaging and editing tools, such as the crop and zoom tools provided in the Kodak Picture CD software sold by Eastman Kodak Company, Rochester, N.Y., U.S.A., to improve the appearance of digital images. These image editing tools allow a user to limit the image content of an image to emphasize important elements in the image. This is known in the art as cropping an image. The cropped image incorporates less image data than the original image. It will be appreciated however, that a digital image, once captured, has a fixed amount of image data associated therewith. When such a digital image is cropped, some of this data is discarded.

Accordingly, when cropped and non-cropped images are rendered for example in a photographic print of the same image quality, the non-cropped images will appear to be larger than the cropped images. Many consumers find the appearance of such images unsatisfying and also elect to re-enlarge the selected portions of cropped images so that they have the appear to have been captured at an image size that is consistent with non-cropped images. Because this re-enlargement simulates what would have happened had the photographer zoomed her camera in toward the subject using a telephoto lens, most digital imaging algorithms provide an automatic "zoom and crop" function which allows a user to designate a selection area in a digital image and that automatically adjusts the selection area to match the area of a non-cropped image.

Accordingly, when the enlargement portion of the process occurs on an image with a reduced amount of data, the image that results from the zoom and crop processing has a reduced image resolution as compared to images that have not been subject to the same process. Where only small portions of the original image are cropped, this reduction in resolution is not always significant. However, as the cropping becomes more aggressive with greater amounts of data being discarded, the effective image resolution of the processed image can degrade noticeably. This effect can reduce consumer satisfaction with the zoom and crop processed image.

Often, zoom and crop functions are performed using image processing systems such as cameras, personal computers, kiosks, personal digital assistants, network centric systems, other devices. These devices commonly have a display for presenting a digital image and a user interface to permit a user to designate a selection area within an image for use in forming a zoom and crop processed image. The digital image data contained the selection area is processed using a zoom and crop algorithm to form a zoom and crop processed image and an evaluation image representing the zoom and crop processed image is formed for presentation on the display. Users often rely upon the appearance of the evaluation image as presented in the display in order to determine whether the zoom and crop processed image represented by the evaluation image has a preferred appearance. Where the evaluation image has an acceptable appearance, users will often elect to store the zoom and cropped processed image, or use a printer or like device to render the zoom and cropped processed image on a film fabric or paper.

However, the limited display resolution of conventional electronic displays and, in particular, small sized displays of the type commonly used in conjunction with digital cameras can mask the loss of resolution in a zoom and crop processed image. Accordingly, users can designate a selection area that comprises only a fraction of the original image without realizing that such aggressive use of the zoom and crop algorithm can reach a point where so much of the data comprising the originally captured digital image has been discarded that the zoom and crop processed image does not have a minimum amount of data necessary to permit the zoom and crop processed image to have a preferred appearance when presented on a high resolution display or rendered by printers or other image forming devices that have relatively high levels of image resolution.

In some cases, this problem can be addressed by the use of image processing algorithms that the attempt to increase the effective resolution him of a low resolution images him by interpolating data from the low resolution image to create a high resolution image. One example of such an algorithm can be found in U.S. Pat. No. 6,058,248 entitled "Computerized Method for Improving Data Resolution" filed by Atkins et al. on May 25, 1999. However, it will be appreciated that such interpolation techniques can introduce unanticipated artifacts in an image which themselves can reduce the acceptability of the image.

Some image processing algorithms, printers, kiosks, and commercial image rendering establishments examine each digital image submitted for high resolution display or rendering to determine whether the image has adequate image resolution to permit a print formed therefrom to have a preferred appearance. For example, OFOTO, Inc. of Emeryville, Calif., is an online photography service that provides top-quality silver halide prints for digital and film camera users. Ofoto's Web site, www.ofoto.com, gives photographers a new and easier way to store and share digital images on line. Once online, these images can be easily edited, cropped, or enhanced with borders and special effects, by using Ofoto's free online tools. Ofoto provides a print image resolution warning when a user submits a digital image for printing that does not meet minimum resolution requirements for a selected type of printed output. While the approach of providing such a warning usefully alerts users that an image submitted for printing does not have sufficient image resolution, it is not always convenient for the user to adjust the image at the time that the warning is received.

Alternatively, zoom and crop image editing algorithms are known that require a user to designate a size that they anticipate that a rendered output image will have and that provide predefined selection area templates that a user can move about an image in order to make a selection area designation. For example, commonly assigned U.S. Pat. No. 5,619,738 entitled "Pre-Processing Image Editing" filed by Petruchick et al. on Apr. 8, 1997 describes a film camera including an electronic display and a driver for presenting movable markers to frame and edit an electronically displayed image. Electronic manipulation of the markers provides for zooming and cropping the image as well as changing the image formation and horizontal and vertical orientation. The camera includes an input for selecting a print format from a predetermine set of print formats each having a predetermined size and aspect ratio. Once that a print format is selected, having a predetermined aspect ratio, cropping is limited to selections that are consistent with that aspect ratio and the standard widths for photographic paper. Further, after a print size and aspect ratio selection is made, markers are formed in the display of the digital image that conform to the size and aspect ratio selected. These markers can be maneuvered within the evaluation image to designate the selected area.

Commonly assigned U.S. Pat. No. 6,018,397, entitled "Digital Image Processing With Indication to User of Hardcopy Output Image Quality" filed by Cloutier et al. on Feb. 13, 1998 describes a digital image processor that establishes a boundary level of acceptable hardcopy print quality level based on selected image print size and printing magnification and provides a warning to a user prior to generation of the hardcopy print that alerts the user when the determine print image quality will be unsatisfactory. This system receives inputs including digital image data representative of an image to be reproduced in hardcopy at a user-selected size, hardcopy image quality information being representative of acceptable and unacceptable levels of hardcopy image quality produced with said hardcopy image reproduction and information representative of the desired magnification and user selected size of the hardcopy image to be output and indicates whether this combination will generate images having an acceptable appearance. The '397 patent provides a warning to a user when the user selects a combination that may not yield acceptable results prior to submitting the image for hard copy image formation. While useful and commercially valuable, this approach requires a user to designate a selection area within the image and indicate a desired output before providing the warning.

However, there viable approaches are needed for helping a user to make selection area designations for zoom and crop processing of an image, without requiring the user to decide in advance what hardcopy outputs or other forms of output use that the user may make of the image. In particular, what is needed is an image processing algorithm that allows a user to make flexible selection area designations for use in zoom and crop processing and yet provides real-time feedback from which a user can appreciate the potential impact of such selections on the use of a zoom and crop processed image based upon a selected area.

SUMMARY OF THE INVENTION

In one aspect of the invention, an imaging method is provided for indicating at least one preferred output form for an area within a digital image. In accordance with the method, a selection area is determined within the digital image and a preferred output image form is determined for rendering an image comprising the selected area of the digital image, with the determination being based upon an image resolution of the digital image, the determined selection area and an output resolution associated with each output form. The preferred output image form is indicated.

In another aspect of the invention, an imaging method is provided for indicating preferred output form for a portion of a digital image. In accordance with the method a digital image having an image resolution is received and an initial selection area designation within the digital image is received. A preferred output image form for rendering an image containing portions of the digital image that are within the initial selection area is determined based upon the image resolution, the selection area designated and a predetermined resolution of at least one image output form. The preferred output image form for the initial selection area of the image is indicated. Subsequent selection area designations within the digital image are received and a preferred output image form for rendering an image containing portions of the digital image from within each subsequently designated selection area is determined based upon the image resolution, the subsequently designated selection area and a predetermined resolution of a least one output image form. The preferred output image form for each subsequently designated selection area is indicated.

In still another aspect of the invention, a method is provided for using a first digital image to form a second digital image. In accordance with the method, the first digital image is presented and a selection of a portion of the first digital image is received. A determination made as to which of a plurality of output forms is preferred for use with the selected portion of the first digital image and an indication of each determined output form is presented. A second image is formed based upon the selected portion. Wherein the second image is formed only after an indication of each determined output form is presented.

In other aspects of the invention, computer program products are provided for performing the methods claimed.

In still another aspect of the invention, an imaging system is provided. The imaging system has a source of a digital image having an image resolution, an indicating system having human detectable indications of preferred image output forms and a user interface system. A controller is provided and is operable in an image editing mode wherein the controller is adapted to cause the digital image to be presented on the display, to determine a selection area within the digital image based upon signals from the user interface system, to determine preferred output image forms for rendering an image including the selected area of the digital image wherein the determination is based upon the image resolution of the digital image, the determined selection area and an output resolution associated with each output form. The controller causes the indicating system to indicate at least one preferred output image form.

DETAILED DESCRIPTION OF THE INVENTION

Figure 1:
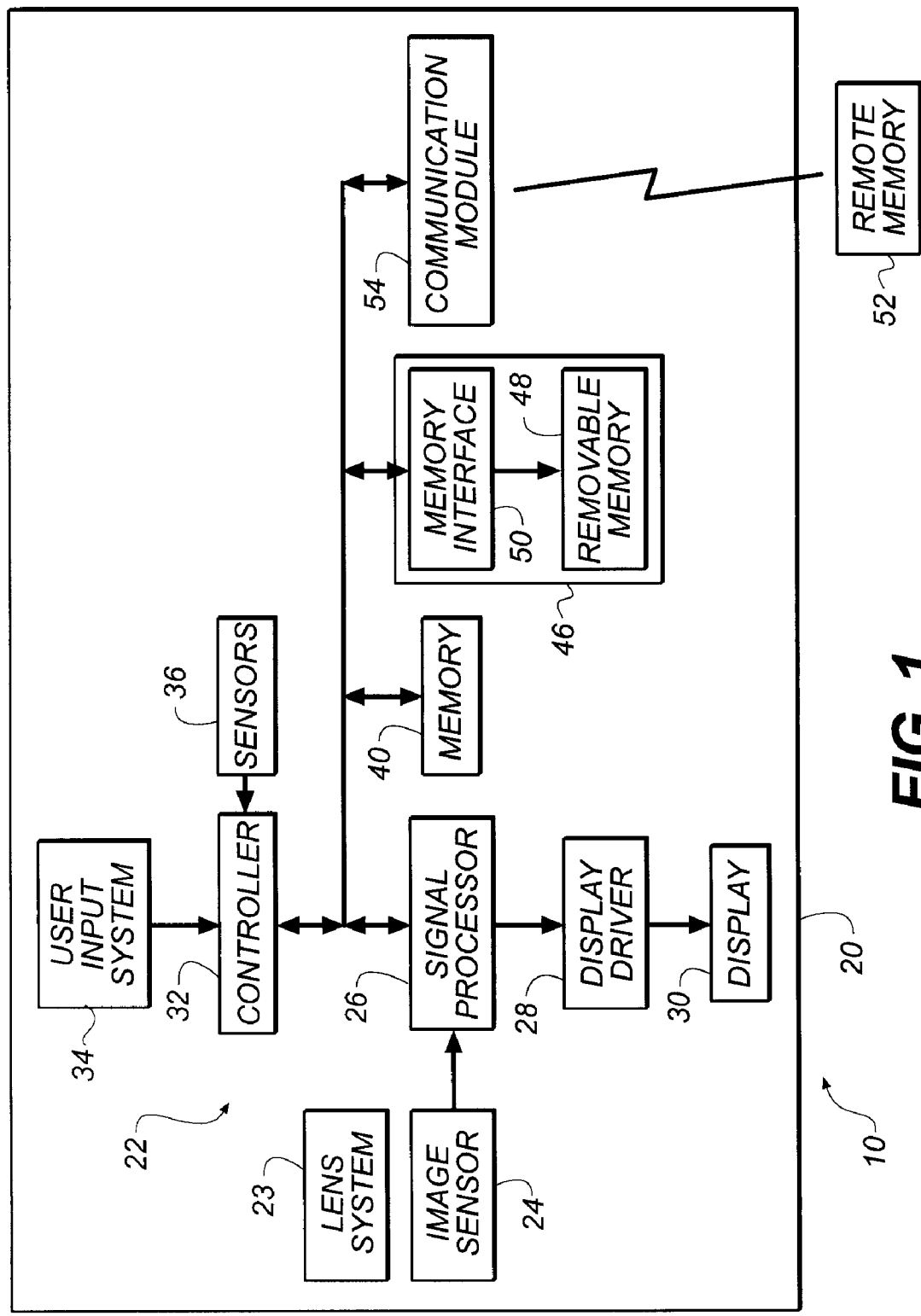
FIG. 1 shows a schematic illustration of one embodiment of a imaging system of the present invention.
Figure 2:
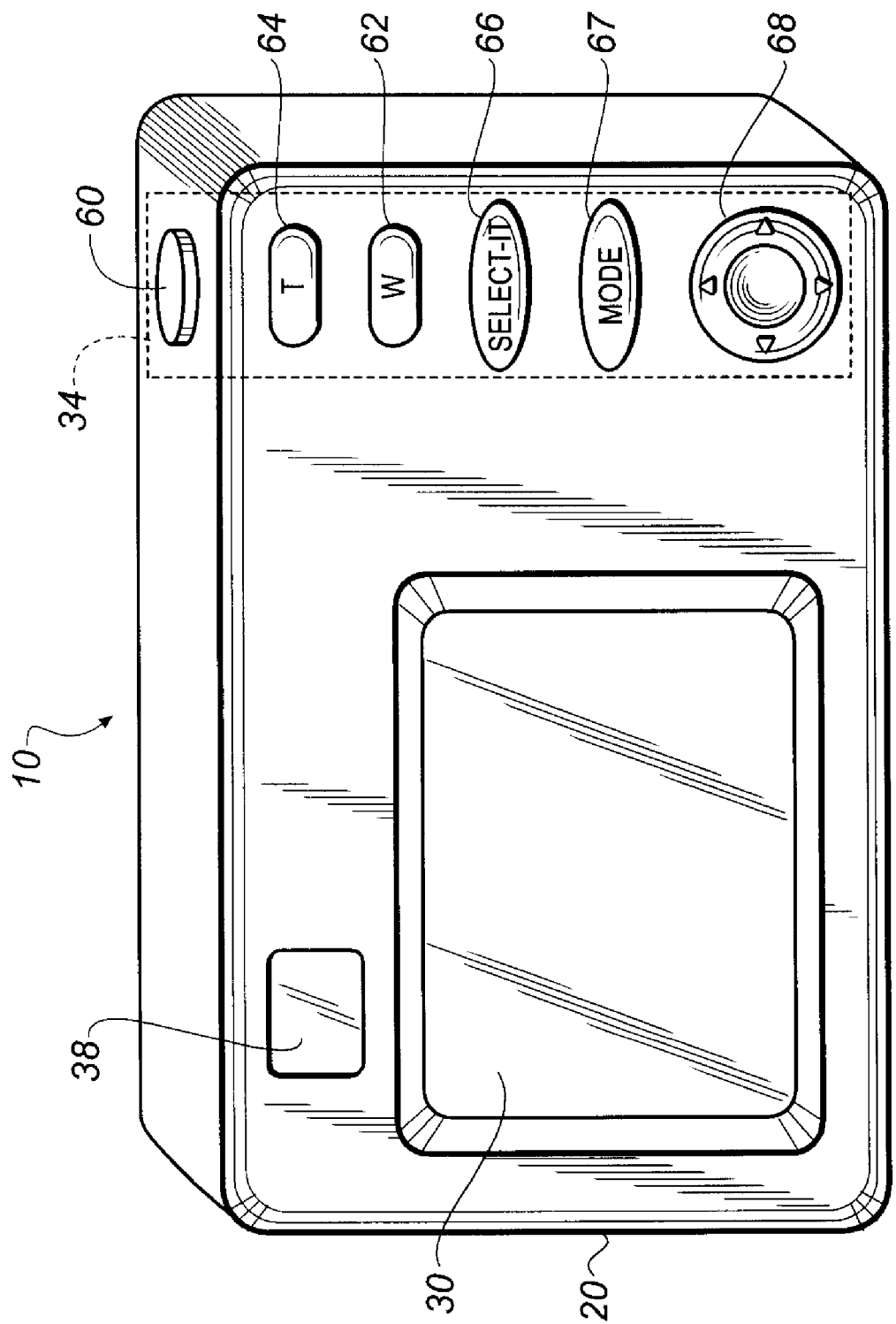
FIG. 2 shows a top, back, right side perspective view of the imaging system of FIG. 1.

FIG. 1 shows a block diagram of one embodiment of an imaging system 10. FIG. 2 shows a top, back, right side perspective view of the imaging system 10 of FIG. 1. As is shown in FIGS. 1 and 2, imaging system 10 comprises a body 20 containing an image capture system 22, a display system 30 having a lens system 23, an image sensor 24, a signal processor 26, an optional display driver 28 and a display 30. In operation, light from a scene is focused by lens system 23 to form an image on image sensor 24. Lens system 23 can have one or more elements. Lens system 23 can be of a fixed focus type or can be manually or automatically adjustable. Lens system 23 is optionally adjustable to provide a variable zoom that can be varied manually or automatically. Other known arrangements can be used for lens system 23.

Light from the scene that is focused by lens system 23 onto image sensor 24 is converted into image signals representing an image of the scene. Image sensor 24 can comprise a charge couple device (CCD), a complimentary metal oxide sensor (CMOS), or any other electronic image sensor known to those of ordinary skill in the art. Image signals I can be in digital or analog form.

Signal processor 26 receives image signals I from image sensor 24 and transforms the image signal into a digital image in the form of digital data. The digital image can comprise one or more still images, multiple still images and/or a stream of apparently moving images such as a video segment. Where the digital image data comprises a stream of apparently moving images, the digital image data can comprise image data stored in an interleaved or interlaced image form, a sequence of still images, and/or other forms known to those of skill in the art of digital video.

Signal processor 26 can apply various image processing algorithms to the image signals when forming a digital image. These can include but are not limited to color and exposure balancing, interpolation and compression. Where the image signals are in the form of analog signals, signal processor 26 also converts these analog signals into a digital form.

A controller 32 controls the operation the imaging system 10, including but not limited to image capture system 22, display 30 and memory such as memory 40 during imaging operations. Controller 32 causes image sensor 24, signal processor 26, display 30 and memory 40 to capture, store and display images in response to signals received from a user input system 34, data from signal processor 26 and data received from optional sensors 36. Controller 32 can comprise a microprocessor such as a programmable general purpose microprocessor, a dedicated micro-processor or micro-controller, or any other system that can be used to control operation of imaging system 10.

Controller 32 cooperates with a user input system 34 to allow imaging system 10 to interact with a user. User input system 34 can comprise any form of transducer or other device capable of receiving an input from a user and converting this input into a form that can be used by controller 32 in operating imaging system 10. For example, user input system 34 can comprise a touch screen input, a touch pad input, a 4-way switch, a 6-way switch, an 8-way switch, a stylus system, a trackball system, a joystick system, a voice recognition system, a gesture recognition system or other such systems. In the embodiment shown in FIGS. 1 and 2 user input system 34 includes a shutter trigger button 60 that sends a trigger signal to controller 32 indicating a desire to capture an image.

In the embodiment of imaging system 10 shown in FIGS. 1 and 2, user input system 34 also includes a wide-angle zoom button 62, and a tele zoom button 64 that cooperate with controller 32 to control the zoom settings of lens system 23 causing lens system 23 to zoom out when wide angle zoom button 62 is depressed and to zoom out when tele zoom button 64 is depressed. Wide-angle zoom lens button 62 and telephoto zoom button 64 can also be used to provide signals that cause signal processor 26 to process image signal so that the digital image formed thereby appears to have been captured at a different zoom setting than that actually provided by the optical lens system. This can be done by using a subset of the image signal and interpolating a subset of the image signal to form the digital image. User input system 34 can also include other buttons including joystick 66 shown in FIG. 2, the mode selector button 67 and select-it button 68 shown in FIG. 2, the function of which will be described in greater detail below.

Sensors 36 are optional and can include light sensors, range finders and other sensors known in the art that can be used to detect conditions in the environment surrounding imaging system 10 and to convert this information into a form that can be used by controller 32 in governing operation of imaging system 10. Sensors 36 can also include biometric sensors adapted to detect characteristics of a user for security and affective imaging purposes.

Controller 32 causes an image signal and corresponding digital image to be formed when a trigger condition is detected. Typically, the trigger condition occurs when a user depresses shutter trigger button 60, however, controller 32 can determine that a trigger condition exists at a particular time, or at a particular time after shutter trigger button 60 is depressed. Alternatively, controller 32 can determine that a trigger condition exists when optional sensors 36 detect certain environmental conditions.

Controller 32 can also be used to generate metadata M in association with each image. Metadata is data that is related to a digital image or a portion of a digital image but that is not necessarily observable in the image data itself. In this regard, controller 32 can receive signals from signal processor 26, camera user input system 34 and other sensors 36 and, optionally, generates metadata based upon such signals. The metadata can include but is not limited to information such as the time, date and location that the archival image was captured, the type of image sensor 24, mode setting information, integration time information, taking lens unit setting information that characterizes the process used to capture the archival image and processes, methods and algorithms used by imaging system 10 to form the archival image. The metadata can also include but is not limited to any other information determined by controller 32 or stored in any memory in imaging system 10 such as information that identifies imaging system 10, and/or instructions for rendering or otherwise processing the digital image with which the metadata is associated. The metadata can also comprise an instruction to incorporate a particular message into digital image when presented. Such a message can be a text message to be rendered when the digital image is presented or rendered. The metadata can also include audio signals. The metadata can further include digital image data. The metadata can also include any other information entered into imaging system 10.

The digital images and optional metadata, can be stored in a compressed form. For example where the digital image comprises a sequence of still images, the still images can be stored in a compressed form such as by using the JPEG (Joint Photographic Experts Group) ISO 10918-1 (ITU-T.81) standard. This JPEG compressed image data is stored using the so-called "Exif" image format defined in the Exchangeable Image File Format version 2.2 published by the Japan Electronics and Information Technology Industries Association JEITA CP-3451. Similarly, other compression systems such as the MPEG-4 (Motion Pictures Export Group) or Apple Quicktime™ standard can be used to store digital image data in a video form. Other image compression and storage forms can be used.

The digital images and metadata can be stored in a memory such as memory 40. Memory 40 can include conventional memory devices including solid state, magnetic, optical or other data storage devices. Memory 40 can be fixed within imaging system 10 or it can be removable. In the embodiment of FIG. 1, imaging system 10 is shown having a memory card slot 46 that holds a removable memory 48 such as a removable memory card and has a removable memory interface 50 for communicating with removable memory 48. The digital images and metadata can also be stored in a remote memory system 52 that is external to imaging system 10 such as a personal computer, computer network or other imaging system.

In the embodiment shown in FIGS. 1 and 2, imaging system 10 has a communication module 54 for communicating with the remote memory system. The communication module 54 can be for example, an optical, radio frequency or other transducer that converts image and other data into a form that can be conveyed to the remote imaging system by way of an optical signal, radio frequency signal or other form of signal. Communication module 54 can also be used to receive a digital image and other information from a host computer or network (not shown). Controller 32 can also receive information and instructions from signals received by communication module 54 including but not limited to, signals from a remote control device (not shown) such as a remote trigger button (not shown) and can operate imaging system 10 in accordance with such signals. Signal processor 26 optionally also uses images signals or the digital images to form evaluation images which have an appearance that corresponds to captured image data and are adapted for presentation on display 30. This allows users of imaging system 10 to observe digital images that are available in imaging system 10 for example images that have been captured by image capture system 22, that are otherwise stored in a memory such as memory 40, removable memory 48 or that are received by way of communication module 54. Display 30 can comprise, for example, a color liquid crystal display (LCD), organic light emitting display (OLED) also known as an organic electroluminescent display (OELD) or other type of video display. Display 30 can be external as is shown in FIG. 2, or it can be internal for example used in a viewfinder system 38. Alternatively, imaging system 10 can have more than one display with, for example, one being external and one internal.

Signal processor 26 and controller 32 also cooperate to generate other images such as text, graphics, icons and other information for presentation on display 30 that can allow interactive communication between controller 32 and a user of imaging system 10, with display 30 providing information to the user of imaging system 10 and the user of imaging system 10 using user input system 34 to interactively provide information to imaging system 10. Imaging system 10 can also have other displays such as a segmented LCD or LED display (not shown) which can also permit signal processor 26 and/or controller 32 to provide information to user. This capability is used for a variety of purposes such as establishing modes of operation, entering control settings, user preferences, and providing warnings and instructions to a user of imaging system 10. Other systems such as known systems and actuators for generating audio signals, vibrations, haptic feedback and other forms of signals can also be incorporated into imaging system 10 for use in providing information, feedback and warnings to the user of imaging system 10.

Typically, display 30 has less imaging resolution than image sensor 24. Accordingly, signal processor 26 reduces the resolution of image signal or digital image when forming evaluation images adapted for presentation on display 30. Down sampling and other conventional techniques for reducing the overall imaging resolution can be used. For example, resampling techniques such as are described in commonly assigned U.S. Pat. No. 5,164,831 "Electronic Still Camera Providing Multi-Format Storage Of Full And Reduced Resolution Images" filed by Kuchta et al., on Mar. 15, 1990, can be used. The evaluation images can optionally be stored in a memory such as memory 40. The evaluation images can be adapted to be provided to an optional display driver 28 that can be used to drive display 30. Alternatively, the evaluation images can be converted into signals that can be transmitted by signal processor 26 in a form that directly causes display 30 to present the evaluation images. Where this is done, display driver 28 can be omitted.

Imaging system 10 can receive digital images for processing in a variety of ways. For example, imaging system 10 can capture digital images using image sensor 24 as described above. Imaging operations that can be used to obtain digital images from image capture system 22 include a capture process and can optionally also include a composition process and a verification process. During the optional composition process, controller 32 causes signal processor 26 to cooperate with image sensor 24 to capture digital images and present a corresponding evaluation images on display 30. In the embodiment shown in FIGS. 1 and 2, controller 32 enters the image composition phase when shutter trigger button 60 is moved to a half depression position. However, other methods for determining when to enter a composition phase can be used. For example, one of user input system 34, for example, the "fix-it" button 66 shown in FIG. 2 can be depressed by a user of imaging system 10, and can be interpreted by controller 32 as an instruction to enter the composition phase. The evaluation images presented during composition can help a user to compose the scene for the capture of digital images.

The capture process is executed in response to controller 32 determining that a trigger condition exists. In the embodiment of FIGS. 1 and 2, a trigger signal is generated when shutter trigger button 60 is moved to a full depression condition and controller 32 determines that a trigger condition exists when controller 32 detects the trigger signal. During the capture process, controller 32 sends a capture signal causing signal processor 26 to obtain image signals from image sensor 24 and to process the image signals to form digital image data comprising a digital image. An evaluation image corresponding to the digital image is optionally formed for presentation on display 30 by signal processor 26 based upon the image signal. In one alternative embodiment, signal processor 26 converts each image signal into a digital image and then derives the evaluation image from the digital image.

During the verification phase, the corresponding evaluation image is supplied to display 30 and is presented for a period of time. This permits a user to verify that the digital image has a preferred appearance.

Digital images can also be received by imaging system 10 in ways other than image capture. For example digital images can by conveyed to imaging system 10 when such images are recorded on a removable memory that is inserted into memory interface 50. Alternatively digital images can be received by way of communication module 54. For example, where communication module 54 is adapted to communicate by way of a cellular telephone network, communication module 54 can be associated with a cellular telephone number or other identifying number that for example another user of the cellular telephone network such as the user of a telephone equipped with a digital camera can use to establish a communication link with imaging system 10 and transmit images which can be received by communication module 54. Accordingly, there are a variety of ways in which imaging system 10 can receive images and therefore it is not essential that imaging system 10 have an image capture system so long as other means such as those described above are available for importing images into imaging system 10.

Figure 3:
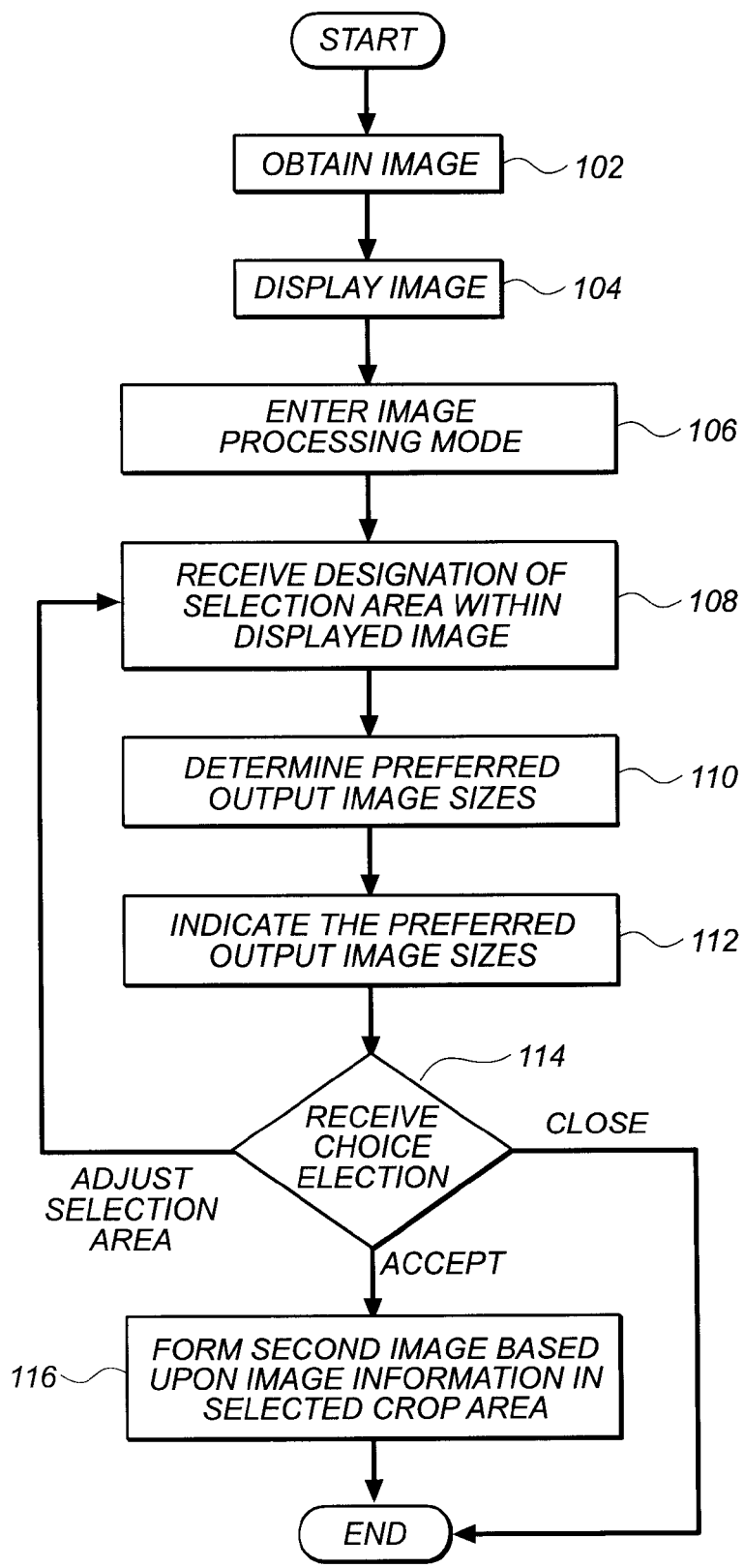
FIG. 3 shows a flow diagram of an embodiment of a method for processing a first image to form a second image.
Figure 4:
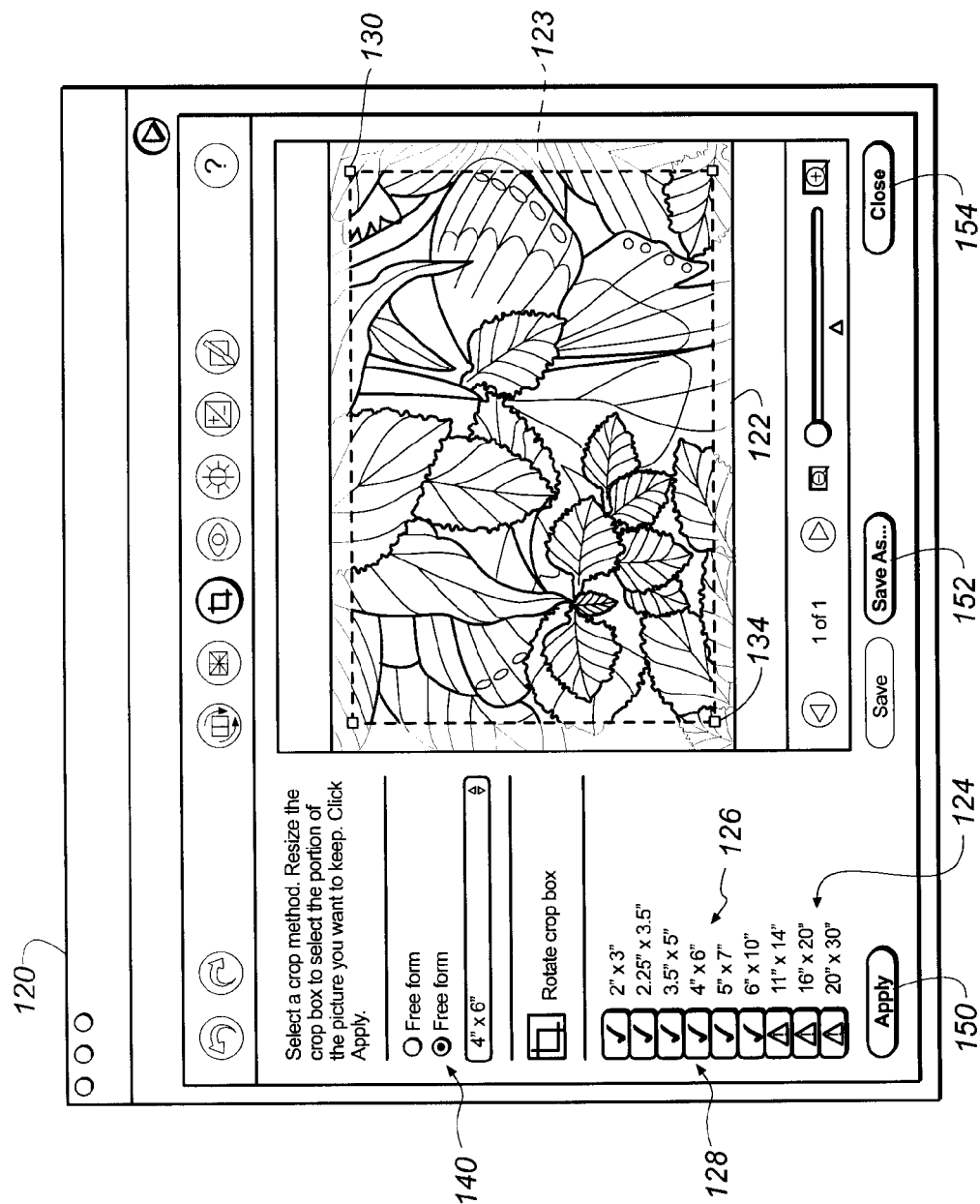
FIG. 4 shows an illustration of one possible embodiment of image processing user interface screen with objects and elements displayed on display.
Figure 5:
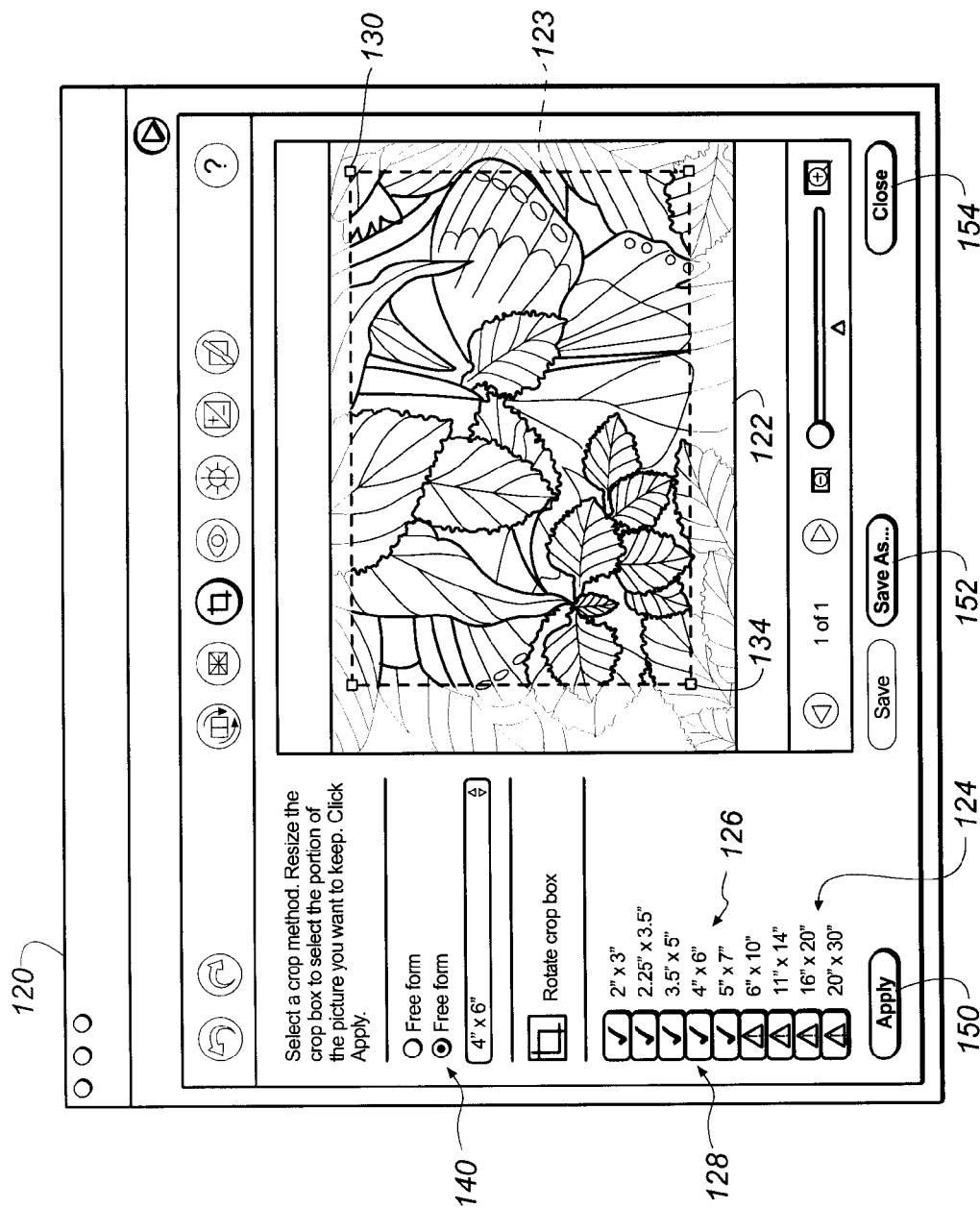
FIGS. 5-7 illustrate the appearance of the screen of the embodiment of FIG. 4 with different selection areas.
Figure 6:
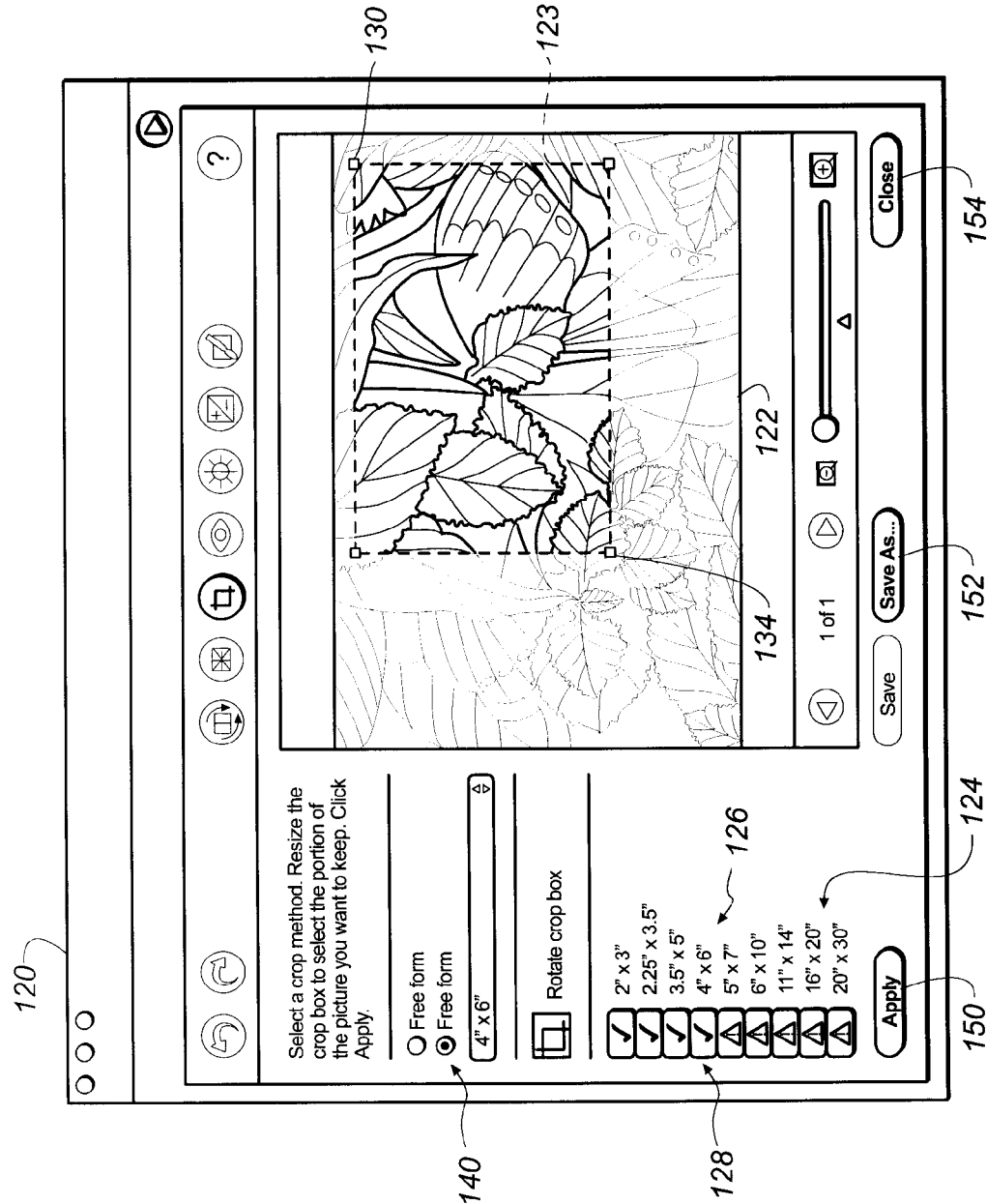
Figure 7:
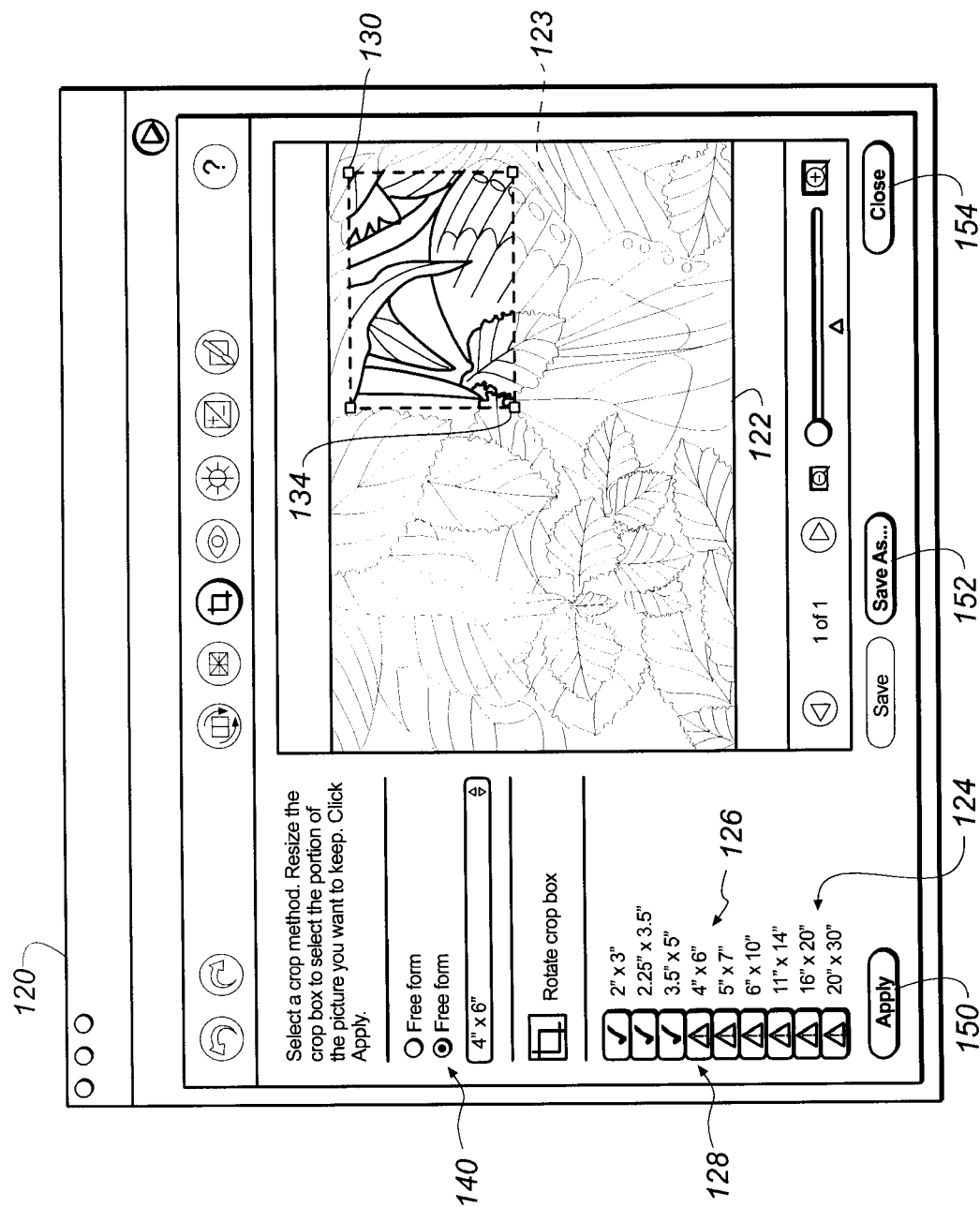

The image processing features of imaging system 10 of FIGS. 1 and 2 will now be described with reference to FIGS. 3, 4, 5, 6, 7, and 8. FIG. 3 shows a flow diagram of an embodiment of a method for processing a first image to form a second image. FIG. 4 shows an illustration of one possible embodiment of image processing user interface screen with objects and elements displayed on display 30. FIGS. 5-7 illustrate the appearance of the screen of the embodiment of FIG. 4 with different selection areas.

In the following description, an image processing method will be described that can be performed using imaging system 10. However, in another embodiment, the methods described hereinafter can take the form of a computer program product for performing the methods described. The computer program product for performing the described methods can be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program product for performing the described methods may also be stored on a computer readable storage medium that is connected to imaging system 10 by way of the internet or other communication medium. Those skilled in the art will readily recognize that the equivalent of such a computer program product can also be constructed in hardware.

In describing the following methods, it should be apparent that the computer program product embodiment can be utilized by any well-known computer system, including but not limited to the computing systems incorporated in the embodiment of imaging system 10 of FIGS. 1 and 2. However, many other types of computer systems can be used to execute the computer program embodiment. Examples of such other computer systems include personal computers, personal digital assistants, work station, internet systems and the like. Consequently, the computer system will not be discussed in further detail herein.

Turning now to FIG. 3, the method for indicating image quality is shown. In a first step of this method, a digital image is obtained (step 100). The digital image can be obtained by image capture using image capture system 22 alternatively the image can be obtained from other sources such as from memory 40, removable memory 48 or from a remote source such as a remote device 52 using communication module 54.

An evaluation image that corresponds to the appearance of the obtained digital image is then displayed on display 30 (step 102). Where the digital image is a video image or otherwise contains a set of more than one image, a representative still image can be presented as the evaluation image. For example the first image frame in a stream of video image data can be presented.

An image processing mode is then selected (step 104). In the embodiment shown in FIGS. 1 and 2, this can be done using mode selection button 66. This can be done in any of a variety of ways. For example, the imaging system 10 can be operable in a plurality of modes such as capture, review, editing and sharing modes. Imaging system 10 can cycle between active modes by repeated depression of mode selection button 67 with the active mode being indicated on display 30 and a selection of an active mode being made using select it button 68. In an alternative embodiment, mode selection button 66 can be depressed to indicate to controller 32 that the user of imaging system 10 intends to select a mode of operation for imaging system 10. Controller 32 can the cause a list of modes to be displayed on display 30. A user of imaging system 10 can navigate between modes using, for example, by using joystick 66 to move an indicator between the displayed modes and can select a desired mode using the select-it button 66. Other selection methods can also be used.

In the embodiment of FIG. 3, when a zoom and crop editing mode is selected, signal processor 26 causes display 30 to present a zoom and crop editing screen to be displayed. Examples of this screen are shown in FIGS. 4-9. Zoom and crop editing screen 120 comprises an evaluation image area 122 and an indication area 124. Evaluation image area 122 contains an evaluation image 123 that corresponds to the digital image that is being edited. Indication area 124 contains, in this embodiment, icons and text that indicate potential output forms for the image that is being edited 126 with each output form being associated with an preference indicator 128. In the embodiment shown in FIG. 4, the preference indicator has two states, a warning comprising a triangle with an exclamation point therein and an acceptability confirmation comprising a check mark. It will be appreciated that any of a number of other icons can be used for this purpose.

Controller 32 then monitors the condition of selected user inputs 34 to receive a user designation of a selection area for use in forming an area of interest selection by a user of imaging system 10 (step 106). In the embodiment shown in FIGS. 1 and 2, a user of imaging system 10 can use joystick 66 to position a cursor or other graphic icon or marker at a first point 130 in the displayed appearance and the select it button 68 to select a point 130 as the first point in a selection area 132 within the evaluation image 123. The user of imaging system 10 then uses joystick 66 to move the cursor to a second point 134 within the evaluation image 123. In the embodiment shown in FIG. 4, a predefined shape 136 is formed within image 123 between points 130 and 134 that visually separates portions of evaluation image 123 that are outside of the predefined shape from those that are within the predefined shape 136. In the embodiment shown in FIGS. 4-7, selection area 132 is determined to be the area within predefined shape 136. However, this is not necessarily so and in other embodiments a user can use user controls 34 to indicate that the area outside of the predefined shape is to be used as the selection area.

As is shown in FIGS. 4-7, image editing screen 120 also comprises a selection area form designator 140. Selection area form designator 140 permits a user to select one predefined shape from among many available shapes. Such predefined shapes typically are associated with particular forms of output such as the ubiquitous 4"×6" print format, the panoramic print format or other formats. Such predefined shapes can include but are not limited to rectangular, triangular, pentagonal, hexagonal, circular, arcurate, elliptical, oval and other forms. However selection area form designator 140 also enables the user to indicate that the user wishes to define a free form shape using, for example, joystick 66 and select-it button 68 or using other user controls 34. This permits the user to have maximum freedom in defining the meets and bounds of selection area 132. As the selection area is defined, a determination is made as to which of the available image output forms 126 displayed in indication area 124 can be used in conjunction with a zoom and crop processed image that contains imaging information selected from regions of the digital image that correspond to regions of the evaluation image 123 presented on screen 120 that are within selection area 132 to form images having a preferred appearance. This determination can be made, for example, based upon analysis of the amount of image information that is available within selection area 132 of the digital image and the amount of image information necessary to render an image for use in a particular output form. This can be measured in terms of available image resolution that is measured as the number of unique image elements per unit area. For example, the number of unique image elements per unit area within the selection area of the digital image may be 25 elements per cm whereas the number of unique image elements per unit area that a particular printer or display is capable of generating at a particular output image form can be 45 elements per cm.

A simple threshold test can be applied that compares the image data available within the selection area of the digital image and the requirements of the output form with the available image capacity of the image. This threshold test is applied to each output form displayed in the status display area 124 and a determination is made for each output form. This threshold test can take the form of a truth table or like logical structure. The step of determining the preferred output image size can also be based in part upon the determined compression settings for the digital input file with adjustments being made for conditions where compressions settings have the effect of reducing the apparent resolution of the compressed digital image.

An indication is then made as to which output forms are preferred for rendering an image formed based upon the image data within the currently defined selection area of the image (step 112). For example, as is illustrated in FIG. 4, with a rectangular selection area 132 defined between points 130 and 134 it can be determined that there is sufficient available image resolution to form images having a preferred appearance in output forms including prints at the 2"×3", 2.25"×3.5", 3.5"×5", 4"×6", 5"×7" forms and the status indicators 128 associated with these forms indicate that they are preferred. However, as is shown in FIG. 4, it is determined that there is not sufficient resolution for images to be rendered at the 8"×10", 11"×14", 16"×20" or 20"×30" forms and accordingly, the status indicators associated with these forms transition to the non-preferred state.

Imaging system 10 can then receive a choice election from user controls 34 (step 114). An election can be made indicating that the zoom and crop algorithm is to be applied to form an image based upon the imaging information in area of the digital image in designated selection area in which case the zoom and crop algorithm is applied to the selection area so that an image is formed that contains imaging information that is within the selection area and that is sized consistently the size of the original digital image or otherwise sized to conform with a preferred image size (step 116). This election can be made for example by moving joystick 66 so that a cursor appears over the accept button 150 on editing screen 120 and depressing the "select-it" button. In this embodiment, when the apply button is selected the digital image itself is modified by the zoom and crop algorithm. Image information from areas that are outside of the selection area is extracted from the digital image and the remaining areas are enlarged. The extracted image information can be discarded saving memory space in imaging system 10. Alternatively the extracted image information can be preserved by storing the extracted image information as metadata in association with the zoom and crop processed digital image.

In still another alternative the zoom and crop algorithm can be used to create a new digital image that is separate from the digital image obtained in step 102. In the embodiment shown in FIG. 4, this is done by using joystick 66 to position a cursor over the "save as" button 152 displayed on screen 120 and depressing the select it button 68. This allows a new image to be formed using only the image information from the selection area of the digital image obtained in step 102 without disturbing the obtained image.

In another alternative, controller 32 can receive a signal from user controls 34 indicating the user does not want to apply the zoom and crop algorithm to this image. This indication can be made for example, where joystick 66 is moved so that a cursor appears over the "close" button 154 on screen 120 and the select it button 68 is pressed.

Alternatively an election can be received by controller 32 from user input system 34 indicating that the user desires to select a new selection area in which case the process returns to step 108. This indication can comprise signals received by controller 32 indicating that the user has adjusted one of points 130 or 134, has selected a different, selection area shape, has elected to go to free form selection area designation, or has otherwise taken action indicating that a new selection area is to be selected.

FIG. 5 shows the designation of such a new user area. As is shown in FIG. 5, point 134 is adjusted so that selection area 132 encompasses a smaller portion of digital image. The process of determining which of the output formats 126 are preferred for this selection area is then performed (step 110) and an indication is made as to which formats are preferred (step 112). As can be seen in FIG. 5 where this is done, the loss of image information occasioned by the downsizing of the selection area 132 from the size shown in FIG. 4 to the size shown in FIG. 5 occasions a loss of image resolution within selection area 132 of FIG. 5 such that the use of the image information within the selection area 132 is no longer preferred for use with the 5"×7" output format. Accordingly, the status indicator 128 associated with the 5"×7" output format 126 transitions from the preferred state to the non-preferred state.

Similarly, FIG. 6 illustrates what occurs if the controller 32 receives signals from user controls 34 indicating that a user wishes to adjust point 134 to further reduce the size of selection area 132 from the size shown in FIG. 5. As can be seen in FIG. 6 where this is done, the loss of image information occasioned by the downsizing of the selection area 132 from the size shown in FIG. 5 to the size shown in FIG. 6 occasions a loss of image resolution in an image formed based upon the image information in selection area 132 such that the use of the image information within the selection area 132 to form an image is no longer preferred for use with the 4"×6" output format. Accordingly, the status indicator 128 associated with the 4"×6" output format 126 transitions from the preferred state to the non-preferred state.

FIG. 7 illustrates what occurs if the controller 32 receives signals from user controls 34 indicating that a user wishes to adjust point 134 to further reduce the size of selection area 132 from the size shown in FIG. 6. As can be seen in FIG. 7 where this is done, the loss of image information occasioned by the downsizing of the selection area 132 from the size shown in FIG. 6 to the size shown in FIG. 7 occasions a further loss of image information in an image formed based upon the image information in selection area 132 such that the use of the image information within the selection area 132 of FIG. 7 to form an image is no longer preferred for use with the 3.5"×5" output format. Accordingly, the status indicator 128 associated with the 3.5"×5" output format 126 transitions from the preferred state to the non-preferred state.

Accordingly, the user of imaging system 10 has an immediate indication as to how the relative size of the selection area 132 can influence whether the image information in selection area 132 will be useful for rendering an image at a particular output image size. Importantly, this indication can be received before the user has made an election as to whether to proceed with executing a zoom and crop algorithm on the designated selection area.

The image resolution capabilities of different output devices used to render images in the predetermined forms can influence whether a particular zoom and crop processed image will have a preferred appearance when the zoom and crop processed image is used. Generic standards that have applicability to a broad cross section of possible devices can be used for the purposes of the method. However, in an alternative embodiment of the present invention, controller 32 is adapted to receive information from user interface 34 or communication module 54 from which controller 32 can determine what kind of output capabilities are associated with an image rendering device to which an image is likely to be sent so that more specific imaging resolution information can be used in performing the determining step 110.

For example, many imaging devices are used by consumers and business people in conjunction with a set of image rendering devices such as a home computer, a home printer, and a preferred on line photo rendering service such as Ofoto, and imaging devices and systems to which digital images on imaging system 10 may be shared. Accordingly, in one embodiment of the invention, controller 32 can determine image rendering capabilities of each such likely image rendering destination and can adjust the determining step 110 and the indicating step 112 so that determinations can be made on a device by device or recipient by recipient basis with multiple status indicator and output formats displayed in status display area 124, each indexed by recipient as shown in table I.

TABLE I

| Home Printer | | Ofoto | | Grandpa's Printer | |
|---|---|---|---|---|---|
| ✓ | 2" × 3" | ✓ | 2" × 3" | ✓ | 2" × 3" |
| ✓ | 2.25" × 3.5" | ✓ | 2.25" × 3.5" | ✓ | 2.25" × 3.5" |
| ✓ | 3.5" × 5" | ✓ | 3.5" × 5" | ✓ | 3.5" × 5" |
| ✓ | 4" × 6" | ✓ | 4" × 6" | ✓ | 4" × 6" |
| ! | 5" × 7" | ✓ | 5" × 7" | ! | 5" × 7" |

It will be appreciated that using such tables it is quickly possible to ascertain whether a particular output source will render a zoom and crop processed image with a preferred appearance. In an alternative embodiment, an additional step in the method of FIG. 3 can further comprise the steps of inquiring whether the zoom and crop processed image will be sent to one or more other people or places, receiving an indication of which other places the zoom and crop processed image will be sent, and obtaining information about the image rendering capabilities associated with such people and places. The obtaining step can be performed manually with this information being entered by way of user controls 34 or it can be automatic with communication module 54 communicating with equipment associated with such persons in advance of determining step 110 in order to obtain this information directly.

In FIGS. 4-7 and in Table I, the indication of image quality has been shown as a columnar listing of output options. It will be appreciated that many users of image editing systems will appreciate that the maximum preferred image size reduces as the selection area is made smaller. Accordingly, in one embodiment, of the present invention, it is necessary only to display a "Maximum Preferred Output Size" marking with an adjustable indication of the largest image size that can render an image having a preferred appearance. For example, in the illustration of FIG. 5, indication area 124 could simply state "Maximum Preferred Output Size: 4"×6". In this example, if the selection area 132 is adjusted from the size shown in FIG. 5 to the size shown in FIG. 6, the indication area 124 could state "Maximum Preferred Output Size: 3.5"×5" or "Selection Preferred for 5"×7" prints". This can be displayed on a smaller portion of display 30 and thus permits more and/or different information to be displayed thereon in addition to this indication.

The step of providing an indication can take forms other than displaying information on display 30. For example, the indication can comprise at least one of a video, text, printed, audio or tactile signal. In this regard, a textual warning can be provided by a separate LCD display, or an audio synthesizer that generates an audio indication of preferred image quality. Warnings can be printed by an associated printer or other device. Further, known actuators can be used to generate tactile signals such as haptic feedback or vibrations or other tactile information output when a non-preferred output form is selected.

In the above described embodiments, the arrangement of the selection area has been described as arranging a set of points within a digital image from which some shaped selection area can be determined. However, other approaches are possible. For example, in one useful embodiment, when imaging device 10 of FIGS. 1 and 2 is in the image processing mode, a user of imaging system 10 can designate a selection area by manipulation of wide angle zoom lens 62 and telephoto zoom lens button 64. When controller 32 detects manipulation of these buttons when in the zoom and crop editing mode, controller 32 can define a selection area within the digital image that is, for example centered on the image with the size of the selection area reduced as the telephoto zoom lens button 64 is depressed and enlarged as the wide angle zoom lens button 62 is depressed.

As is noted above, the selection area designation can be applied to a digital image comprising a single digital image, multiple digital images or motion image information such as a video image. Where a digital image comprises more than one image or a stream of video image information, the selection area can optionally be applied to all of the set of images or stream of images or only to selected ones or portions thereof. In this regard, a user of imaging system 10 can use user input system 34 to select which portions of the more than one image or stream of image information are to be zoom and crop processed in accordance with a selection area. Further, a user can designate different selection areas to allow for different zoom and crop processing of separate images or separate portions of a stream of image information.

In FIGS. 4-7, the output forms have been generally shown and described as comprising particular sizes of output. However, in accordance with the invention the different output forms can also include but are not limited to forms such as fabric printing output, transparency output, output for use in presentation on high resolution video monitors, output for use on cellular phone screens, and other various forms of image output, each of which may have image resolution standards that are different from those of images rendered on print paper at the same size and that any output form that the image may be used for can be considered in the manner described above.

The invention has been described in detail with particular reference to certain preferred embodiments thereof, but it will be understood that variations and modifications can be effected within the spirit and scope of the invention.

PARTS LIST

| | |
|---|---|
| 10 | imaging system |
| 20 | body |
| 22 | image capture system |
| 23 | lens system |
| 24 | image sensor |
| 26 | signal processor |
| 28 | display driver |
| 30 | display |
| 32 | controller |
| 34 | user input system |
| 36 | sensors |
| 40 | memory |
| 46 | memory card slot |
| 48 | removable memory |
| 52 | remote memory |
| 54 | communication module |
| 60 | shutter trigger button |
| 62 | wide angle zoom lens button |
| 64 | telephoto zoom lens button |
| 66 | joystick |
| 67 | mode selector button |
| 68 | select-it button |
| 100 | obtain image step |
| 102 | display image step |
| 104 | select image processing mode |
| 106 | receive user designation of selection area |
| 110 | determination step |
| 112 | indication step |
| 114 | receive choice election step |
| 116 | form image step |
| 120 | zoom and crop editing screen |
| 122 | image evaluation area |
| 123 | evaluation image |
| 124 | indication area |
| 126 | potential output forms |
| 128 | preference indicator |
| 130 | point |
| 132 | selection area |
| 134 | point |
| 136 | predefined shape |
| 140 | selection area form designator |
| 150 | accept button |
| 152 | "save as" button |
| 154 | "close" button |

What is claimed is:

1. A method for indicating a preferred output form for an area of a digital image:
   determining a selection area within the digital image;
   determining a compression setting for the image;
   determining a preferred output image form for rendering an image comprising the selected area of the digital image, with the determination being based upon an image resolution of the digital image, the determined selection area and an output resolution associated with each output form; and,
   indicating the preferred output image form;
   wherein the step of determining the preferred output image form is based in part upon the determined compression setting.

2. The method of claim 1, wherein the selection area is adjustably selected and wherein the indicated preferred output image form is adjusted based upon adjustments to the selection area.

3. The method of claim 1, wherein the selection area is adjustably selected and wherein the indicated preferred output image form is adjusted at substantially the same time that the selection area is adjustably selected.

4. The method of claim 1, wherein the step of determining the preferred output image forms is based upon the output image rendering capabilities of an image rendering device.

5. The method of claim 1, further comprising the step of determining an intended output image rendering device and wherein the step of determining the preferred output image form is determined based upon the output image rendering capabilities of the intended image rendering device.

6. The method of claim 1, further comprising the step of determining a compression setting for the image and wherein the step of determining the preferred output image form is based in part upon the determined compression settings.

7. The method of claim 1, wherein the indication comprises at least one of a video, text, printed, audio or tactile signal.

8. The method of claim 1, wherein the indication comprises an indication of a maximum preferred output size associated with a determined selection area.

9. The method of claim 1, wherein the indication comprises a display of more than one preferred output form, and wherein the step of indicating the preferred output image form comprises determining each output form for which there is sufficient image resolution in the selected area to permit an image used in conjunction with the output form to have a preferred appearance.

10. The method of claim 1, wherein the indication comprises a display of alternate output sources and provides, for each alternate output source, an indication of preferred output image sizes based upon imaging capabilities for each output image source.

11. The method of claim 1, wherein the determination is based upon predetermined image rendering capabilities of more than one imaging device.

12. The method of claim 1, wherein the determination based is upon predetermined image rendering capabilities.

13. The method of claim 1, further comprising the steps of receiving a signal indicating that an image is to be formed using the selection area, and forming an image using only the image information from the selection area, wherein the step of forming the image comprises forming an image having a size substantially similar to the size of the original image.

14. The method of claim 13, further comprising the step of presenting a request for authorization to form a second image based upon the portions of the digital image in the selected area.

15. A computer program product comprising a computer readable medium encoded with a computer program for performing the method of claim 1.

16. A method for indicating preferred output form for a portion of a digital image:
   receiving a digital image having an image resolution;
   receiving an initial selection area designation within the digital image;
   determining a preferred output image form for rendering an image containing portions of the digital image that are within the initial selection area based upon the image resolution, the selection area designated and a predetermined resolution of at least one image output form; and,
   indicating the preferred output image form for the initial selection area of the image,
   receiving subsequent selection area designations within the digital image;
   determining a preferred output image form for rendering an image containing portions of the digital image that are within each subsequently designated selection area based upon the image resolution, the selection area and a predetermined resolution of at least one image output form; and,
   indicating the preferred output image form for each subsequent area designation.

17. The method of claim 16, further comprising the steps of receiving an signal indicating that an image is to be formed using the selection area, and forming an image using area of the digital image within the selection area, wherein the step of forming the image comprises forming an image having a size substantially similar to the size of the digital image.

18. The method of claim 16, further comprising the steps of presenting a request for authorization to form a second image based upon the portions of the digital image in the selected area and receiving a signal indicating that an image is to be formed using area of the digital image within the selection area, and forming an image using the area of the digital image within the selection area, wherein the step of forming the image comprises forming an image having a size substantially similar to the size of the digital image.

19. The method of claim 16, further comprising the step of receiving a designation of one of the determined output forms wherein the step of forming the second image comprises forming a second image based upon the designation.

20. The method of claim 16, further comprising the step of presenting a request for authorization to form a second image based upon the portions of the digital image in the selected area and receiving an authorization.

21. A computer program product comprising a computer readable medium encoded with a computer program for performing the method of claim 16.

22. An imaging system comprising:
   a source of a digital image having an image resolution;
   an indicating system having human detectable indications of preferred image output forms;
   a user interface system; and
   a controller operable to receive, from the source, a digital image having an image resolution, to receive an initial selection area designation within the digital image from the user interface system and to determine a preferred output image form for rendering an image containing portions of the digital image that are within the initial selection area based upon the image resolution, the selection area designated and a predetermined resolution of at least one image output form and to operate the indicating system to present an indication of the preferred output image form for the initial selection area of the image;
   said controller further being operable to receive subsequent selection area designations within the digital image and to determine a preferred output image form for rendering an image containing portions of the digital image that are within each subsequently designated selection area based upon the image resolution, the selection area and a predetermined resolution of at least one image output form and to operate the indicating system to present to indicate the preferred output image form for each subsequent area designation.

23. The imaging system of claim 22, wherein the indicating system comprises at least one of a display, audio system, actuator, haptic feedback system or tactile feedback system.

24. The imaging system of claim 22, wherein the controller is further adapted to form a digital image using the image information from the selection area of the digital image and to generate an image having a size that is substantially similar to the size of the digital image from which the image information in the selection area is defined.

25. The imaging system of claim 22, wherein the controller generated image is generated only after the indication is presented and an authorization to generate the image is received.

26. The imaging system of claim 22, further comprising a communication module adapted to exchange digital images with another device.

27. The imaging system of claim 22, wherein the controller is adapted to detect signals from the user control system indicating that the selection area has been adjusted and adjusts the indication accordingly.

28. The imaging system of claim 22, wherein the controller causes the presented image, the selection area and the indication to be displayed at the same time.

29. The imaging system of claim 22, wherein the controller is further adapted to receive a signal indicating that an image is to be formed using the selection area, and to form an image using only the image information from the selection area, wherein the formed image has a size substantially similar to the size of the digital image.

* * * * *